1,430,456

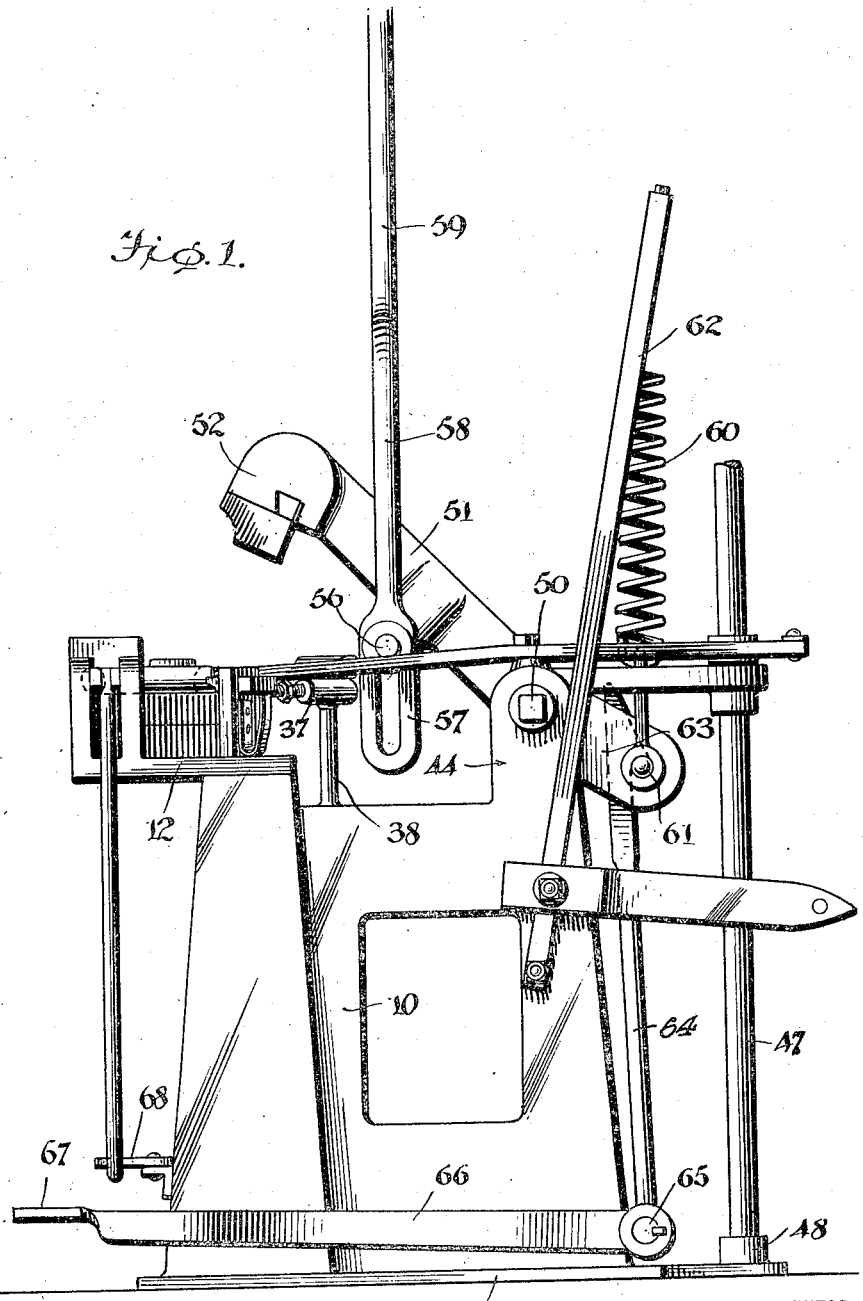

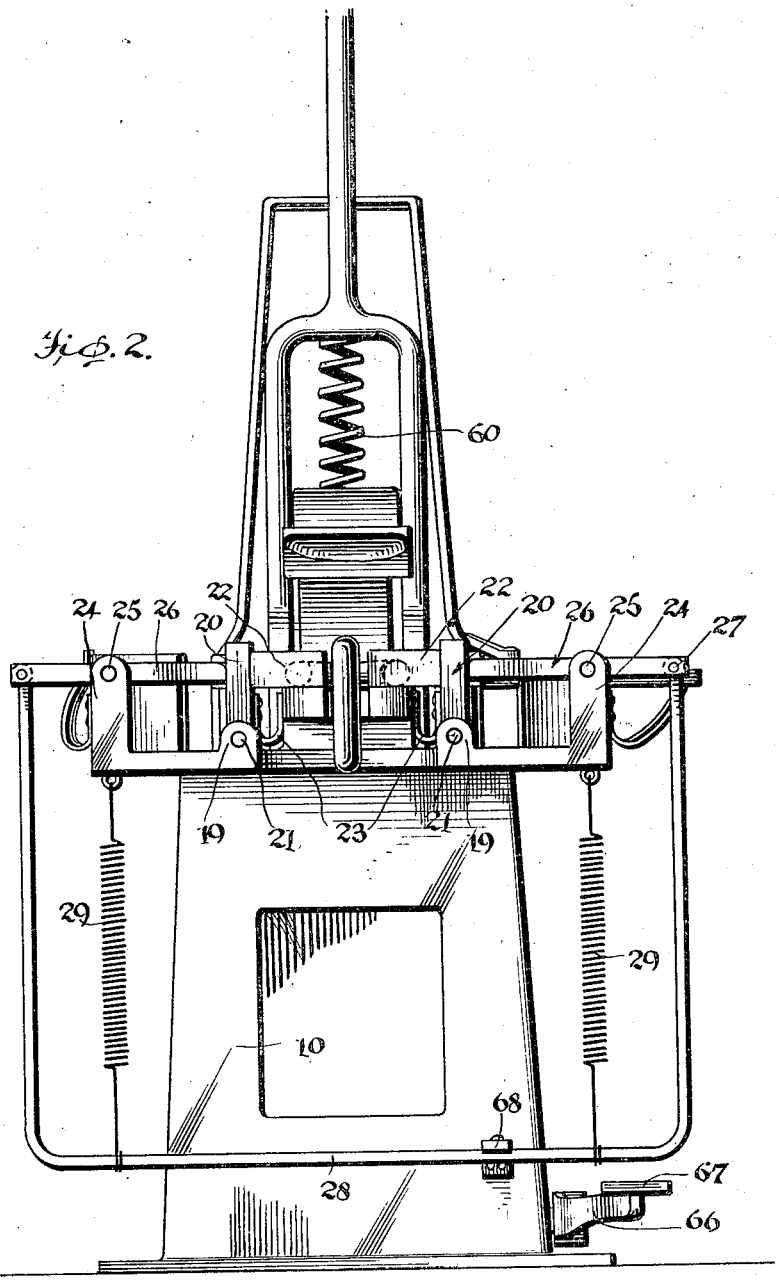

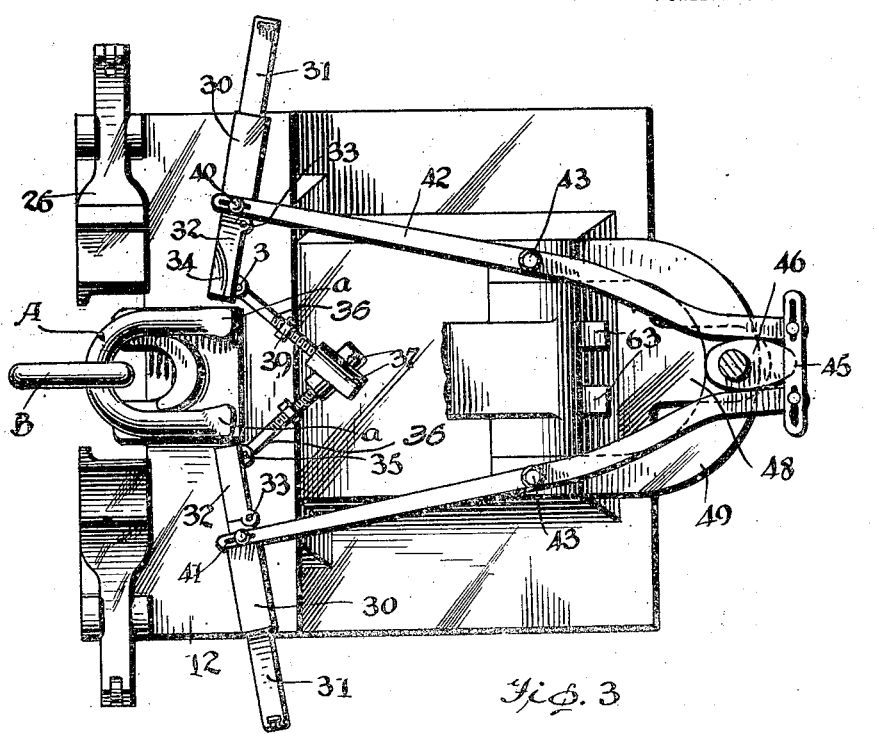
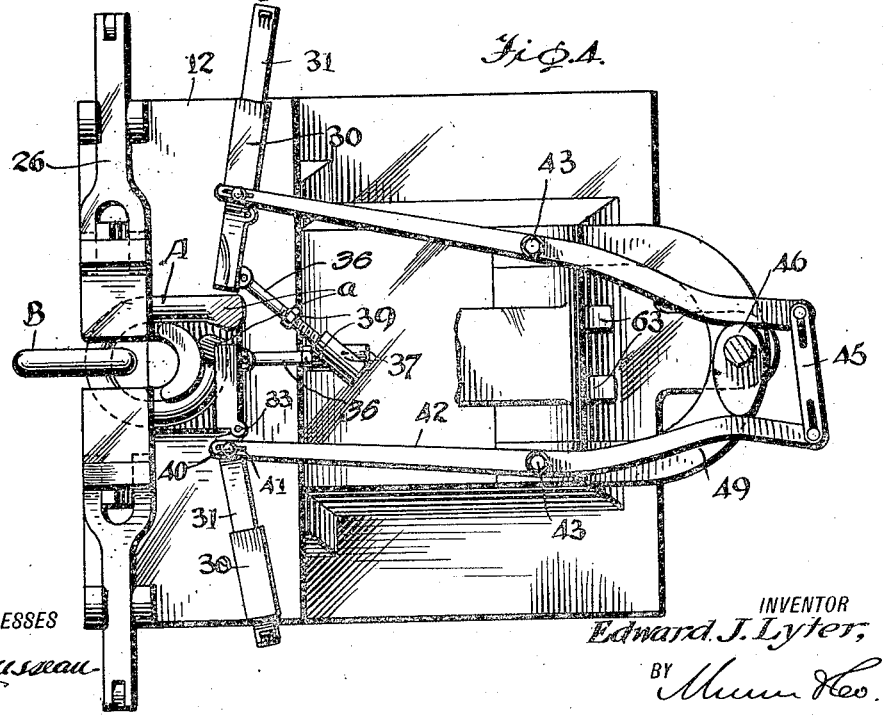

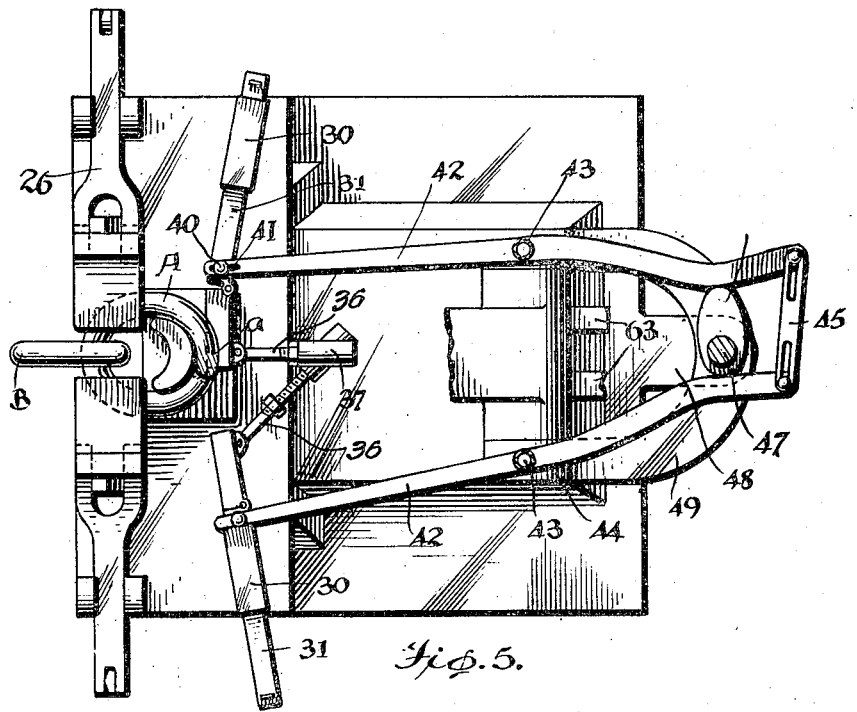
Fig. 5.
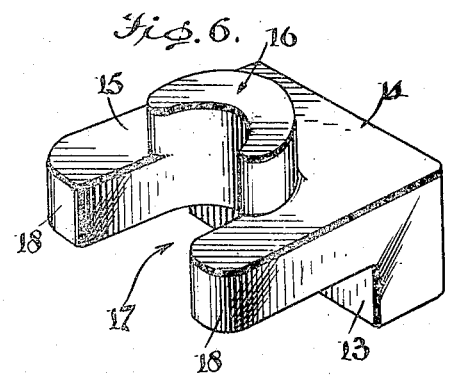
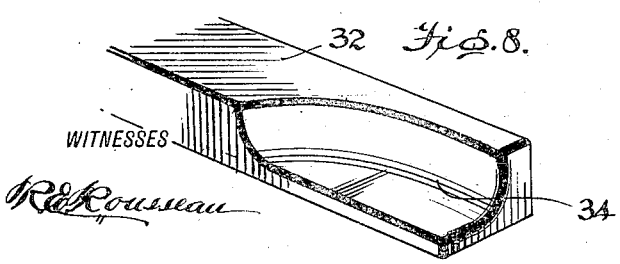
INVENTOR
Edward J. Lyter,
BY
ATTORNEYS Patented Sept. 26, 1922.

UNITED STATES PATENT OFFICE.

EDWARD J. LYTER, OF LEBANON, PENNSYLVANIA.

CHAIN-MAKING MACHINE.

Application filed May 11, 1921. Serial No. 468,531.

*To all whom it may concern:*

Be it known that I, EDWARD J. LYTER, a citizen of the United States, and a resident of Lebanon, in the county of Lebanon and State of Pennsylvania, have invented certain new and useful Improvements in Chain-Making Machines, of which the following is a specification.

My present invention relates generally to chain making machines and devices and more particularly to a link forming and welding machine especially applicable to heavy chain where it is a major consideration that every link be accurately finished in the same size and shape. The primary object of the invention is the provision of a machine by which partially formed links may be completed and welded so that all links will correspond in size, shape and appearance.

A further object is the elimination of hand work in the completion of the links and the necessarily recurring inequalities resulting therefrom.

A still further object is the provision in a machine of this character of a link forming die so shaped and constructed as to provide for the effective cooperation of means rigidly holding a partially formed link so that it may be completed and welded in a quick effective manner.

Still other objects relating for the most part to the details of construction proposed by my invention will be better understood from the following description, reference being made to the accompanying drawings, which form a part of this specification and in which, Figure 1 is a side elevation of the machine, Figure 2 is a front elevation thereof, Figures 3 and 4 are sectional top plan views respectively illustrating the parts in the position at the beginning of operation and after the first bend of the link has been completed, Figure 5 is a similar view showing the parts in position after the second bend of the link has been completed, Figure 6 is a detail perspective view of the link forming die, Figure 7 is a detail perspective view of the hammer carrying die, and Figure 8 is a detail perspective view of a portion of one of the link bending dies.

Referring now to these figures my invention contemplates a machine the frame 10 of which has a flat base 11 and an elevated horizontal table 12 the central front portion of the latter of which is cutaway. This table has a slotted opening in the rear of its cutaway portion to receive the depending shank 13 of a forming die generally indicated at 14 and shown in detail in Figure 6. This die has an upper horizontal flat surface 15 forming an anvil and is provided with an upstanding crescent shaped rib 16 whose outer convex surface is shaped to correspond to the inner contour of one end of a link to be formed and whose inner concave surface is flush with the inner end of a recess 17 at the front of the die leaving forward side projections 18 on which the sides of the link are adapted to rest.

At opposite sides of its central forward cutaway portion, the table 12 has brackets 19 as shown particularly in Figure 2 to which the upright members 20 of a pair of link engaging clamps are pivoted at their lower ends as at 21. These clamps which rock on the pivots 21 also have horizontal link clamping arms 22 projecting toward one another with their undersurfaces cutaway adjacent to their free ends to fit over one end of a link disposed on the forming die 14, the said link clamping members being controlled by springs 23 carried by their upright arms 20 and engaging opposite sides of the forming die 14 so that except when actuated the clamping members are held away from the die as in the position shown in Figure 3.

At its outer side portions the table 12 also has upstanding brackets 24 supporting the fulcrums 25 of a pair of actuating levers 26 whose inner free ends engage the uprights 20 of the link clamping members and whose outer ends are pivotally connected as at 27 to the upper ends of a U-shaped actuating frame whose lower cross bar 28 is disposed at the front of the machine and may be engaged and depressed by the operator against the tension of springs 29 in order to shift levers 26 on their fulcrums 25 and force their inner ends upwardly into engagement with the uprights 20 of the link clamping members in order to rock the latter into the active position shown in Figures 2, 4 and 5 against the tension of springs 23.

At the start of operations a partially formed link of U-shape as seen at A in Figure 3, with its extremities scarfed as at $a$ is placed in properly heated condition upon the forming die 14 with its said free ends projecting rearwardly beyond the crescent shaped rib 16 of the die and with its side portions resting upon the portions 18 of the die at opposite sides of the front recess 17 of the die. Thus the partially formed link A may be passed through a previously formed link B the latter extending partially into the recess 17 of the forming die 14. When the partially formed link A is thus placed as shown particularly in Figure 3, at which time the link clamping members are in outer inactive positions, the operator places his foot upon the cross bar 28 of the actuating frame and depresses the latter so as to shift the link clamping members in the manner previously described to the active position shown in Figures 2, 4 and 5 so that the horizontal arms 22 engage the formed end of the link A and not only press the latter firmly down upon the upper surface of the forming die 14 but also prevent subsequent forward shifting of the link.

At its rear side portions the table 12 has inclined tubular guides 30 for a pair of lengthwise shifting shanks 31 which move forwardly as they shift toward one another. To the inner end of each of these shanks 31 is hingedly connected a bending die 32, the hinged connection being shown at 33, and each of which dies 32 has a portion of its inner surface cutaway as at 34 in Figure 8 so as to receive in this cutout portion one of the scarfed extremities $a$ of the link A being formed. The two bending dies 32 successively shift toward the forming die 14 and into engagement with the link ends so that first one end $a$ and then the other is bent laterally around a portion of the convex outer surface of the rib 16 of the forming die as seen by a comparison of Figures 4 and 5.

Referring particularly to Figure 4 it will be noted that the bending die 32 first coming into operation has its recessed face 34 turned downwardly so that the end $a$ of the link being formed which is first bent is pressed downwardly against the upper flat face 15 of the forming die while the bending die 13 next coming into operation as seen in Figure 5 has its recessed face 34 turned upwardly so that the end $a$ of the link next bent inwardly is forced into overlapping relation to the first bent end with a portion of its respective bending die 32 extending between the same and the first bent end $a$ of the link so as to avoid actual engagement between the link ends as they are overlapped, and in this way avoid danger of improper overlapping through accidental welding of the link ends during the overlapping operation.

Each of the bending dies 32 is pivotally connected adjacent to its free end as at 35 with the forward end of a control rod 36 shiftable at its rear end into and out of a tubular guide 37, the pair of tubular guides 37 being pivotally connected to one another and pivotally mounted upon the upper end of an upright stud 38 projecting upwardly from the frame 10 rearwardly of the center of the table 12. Each control rod 36 is threaded to receive an adjusting nut 39 the latter positioned so as to engage the forward end of the respective pivoted guide 37 and hold the forward end of the respective bending die 32 in properly spaced relation to the rib 16 of the forming die when the said bending die is at the inner limit of its movement as will be plainly seen by a comparison of Figures 4 and 5.

At their inner forward ends, the sliding shanks 31 have upright studs 40 projecting through lengthwise slots 41 of the forward ends of a pair of actuating levers 42 fulcrumed at 43 intermediate their ends upon upstanding rear side portions 44 of the frame 10, the rear ends of these side levers being pivotally connected by a link 45 and disposed upon opposite sides and in engagement with the actuating cam 46 of an upright shaft 47 whose lower end is stepped in a bearing 48 of the base 11 of the frame. This shaft has bearing below the cam 46 in a U-shaped rearwardly projecting bracket 49 of the frame 10 and is driven in any suitable manner with manual control as for instance belt connections with fast and loose pulleys as commonly provided for such purposes. Thus when, after the partially formed link A is placed in the machine as indicated in Figure 3 and clamped as previously described, the operator by manipulating the control of shaft 47 can cause rotation of the latter so that in rotation of the cam 46 the two bending dies will be successively actuated to properly bend the scarfed extremities $a$ of the link into properly overlapping relation in separate operations respectively shown in Figures 4 and 5.

The brackets 44 upstanding from the rear side portions of the frame 10 as before described also support the fulcrum 50 of the hammer 51, the latter of which has a transversely grooved head 52 the groove of which is shaped to receive the dovetailed rib 53 of a hammer die 54 whose lower front portion is cutaway as indicated at 55 in Figure 7 in particular in order to properly fit the contour of the finished link at the overlapping ends thereof. This hammer has side trunnions 56 as shown particularly in Figure 1 extending into the lengthwise slotted lower portions 57 of the lower forked portion 58 of an actuating rod 59 which in its upward movement serves to elevate the forward headed end of the hammer arm, against the tension of a spring 60 whose lower end is connected at 61 to the rear end of the hammer arm and whose upper end is supported by an inverted U-shaped frame 62 whose lower side portions are rigidly secured to the sides of the main frame 10. The bolt 61 extends through spaced rear extensions 63 of the hammer arm and is adapted for engagement by the upper end of a latch bar 64 whose lower end is connected to a shaft 65. To this shaft is also secured the rear end of a foot lever 66 having a foot piece 67 at its forward end in front of the frame 10 so that the operator may elevate the foot lever 66 and cause effective engagement of latch bar 64 with the hammer arm as in the position shown in Figure 1, the actuating rod 59 of the hammer arm raising and lowering independent of the arm by virtue of its slotted extensions 57.

After the link clamping members have been engaged with the link as previously described and shown in Figures 1, 4 and 5, the depressible frame by which the actuating levers 26 are shifted may be locked in its lowermost position by virtue of a pivoted swinging latch 68 so that during subsequent bending operations previously described as well as during action of the hammer arm 51, the link clamping members will be maintained in effective position as in Figures 4 and 5.

After the bending operations as previously described in connection with Figures 4 and 5 have been completed, and with both of the bending dies retracted as in Figure 3, the operator steps upon the foot piece 65 and through lever 66, shaft 65 is thus rocked and moves the latch rod 64 to free the hammer arm. The latter is then alternately pulled up by its actuating rod 59 and forced downwardly by the spring 60, its die 54 repeatedly engaging the overlapping ends a of the link A so as to gradually complete the weld. Operation of the hammer is permitted to continue until the weld is finished, during all of which time the link will be rigidly held in place upon the forming die 14. When the operation is complete the operator simply lifts the foot piece 67 thus shifting the latch bar 66 so that when the hammer head 52 again raises, its lowered rear end will be engaged by the latch and effectively held in inactive position against the tension of spring 60 until in the formation of subsequent links its action again becomes necessary.

It is obvious from the foregoing that my invention provides a comparatively simple machine of the present type and for the present purposes, as well as one which is strong and durable and particularly effective in connection with the manufacture of heavy chain and it is also obvious that the invention is especially efficient in the manufacture of chain where uniformity of the link is especially desired.

I claim:

1. In a link welding machine, a link forming die adapted to receive a partially formed U-shaped link, means for bending the free ends of the link into overlapping relation, means for hammering the overlapped ends of the link, and means working from opposite sides of the said die and engaging the rounded end of the link for securely holding the same on the forming die during the bending and welding thereof, said last named means including angular swinging link clamping members, levers engageable with said members to shift the same into active position, and means for simultaneously actuating the said levers including means for holding the levers in active position.

2. In a link welding machine, a forming die adapted to receive a partially formed U-shaped link, having an upstanding rib around which the free ends of the link may be bent, means working from opposite sides of the die adjacent to its forward portion to engage the rounded end of the partially formed link and securely hold the same on the die, means working from opposite sides of the die adjacent to its rear portion to successively engage and bend the free ends of the link into overlapping relation, and means for hammering the overlapped ends of the link, said link holding means including a pair of link clamping members having upright arms pivoted at their lower ends at opposite sides of the die and having horizontal arms whose free ends are provided with lower recesses to receive and engage the rounded end of the link, springs for holding said clamping members in retracted position, levers engageable with said members to shift the same to active position, and means to simultaneously actuate the levers including a U-shaped frame whose ends have connection with the levers and whose cross bar forms a foot piece as described.

3. In a link welding machine, a die adapted to receive a partially formed U-shaped link and having an upstanding portion around which the free ends of the link may be bent, means engageable with the rounded end of the link to hold the same on a die, and means working on opposite sides of the die and at convergent angles with respect to one another, for successively bending the free ends of the link into overlapping relation, including a pair of slide bars, bending dies hingedly connected to the inner adjacent ends of the slide bars, and means to control the yielding movement of the bending dies with respect to the slide bars as the latter are shifted toward and into engagement with the free ends of the link.

4. In a link welding machine, a die adapted to receive a partially formed U-shaped link and having an upstanding portion around which the free ends of the link may be bent, means engageable with the rounded end of the link to hold the same on a die, and means working on opposite sides of the die and at convergent angles with respect to one another, for successively bending the free ends of the link into overlapping relation, including a pair of slide bars, bending dies hingedly connected to the inner adjacent ends of the slide bars, and means to control the yielding movement of the bending dies with respect to the slide bars as the latter are shifted toward and into engagement with the free ends of the link, each of said bending dies having a recessed portion to receive its respective end of the link and one of the dies having a portion which is interposed between the link ends as the latter are overlapped.

5. In a link welding machine, a die adapted to receive a partially formed U-shaped link and having an upstanding portion around which the free ends of the link may be bent, means engageable with the rounded end of the link to hold the same on a die, and means working on opposite sides of the die and at convergent angles with respect to one another, for successively bending the free ends of the link into overlapping relation, including a pair of slide bars, bending dies hingedly connected to the inner adjacent ends of the slide bars, and means to control the yielding movement of the bending dies with respect to the slide bars as the latter are shifted toward and into engagement with the free ends of the link each of said slide bars having an actuating lever, connections between said actuating levers, and means operable in connection with both of said levers for successively actuating the same.

6. In a link welding machine, a pair of bending dies, slide bars to which the said bending dies are hinged for movement toward and away form one another and in inclined relation, levers engaging the slide bars for shifting the same, means for actuating the levers, and means for controlling yielding movement of the bending dies on their hinges including slide rods pivotally connected at one end to the bending dies adjacent to the free ends of the latter, pivoted tubular guides into and out of which the opposite ends of the slide rods are shiftable, and members adjustable on the slide rods and engageable with their guides to limit movement of the slide rods in one direction.

7. In a machine of the character described, a pair of slide bars movable toward and away from one another in inclined relation, bending dies hingedly connected to the slide bars to move with the latter, means for controlling yielding movement of the dies on their hinges, a pair of levers fulcrumed intermediate their ends and pivotally connected at one end to the said slide bars, said levers having their opposite ends in spaced approximately paralel relation, a link connecting the last mentioned ends of the levers, an actuating shaft extending between the last mentioned ends of the levers, and a cam on the shaft between and engaging the last mentioned ends of the levers for successively actuating the levers as described.

EDWARD J. LYTER.